United States Patent [19]

Miller

[11] 4,074,321
[45] Feb. 14, 1978

[54] CIRCUIT FOR SEPARATING CHROMA AND LUMINANCE INFORMATION IN A COMPOSITE VIDEO SIGNAL

[75] Inventor: William George Miller, Fort Wayne, Ind.

[73] Assignee: The Magnavox Company, Fort Wayne, Ind.

[21] Appl. No.: 731,190

[22] Filed: Oct. 12, 1976

[51] Int. Cl.² .................... H04N 9/00; H04N 9/535
[52] U.S. Cl. ................................. 358/31; 358/37; 358/38; 358/904
[58] Field of Search .............. 358/904, 21, 31, 37, 358/38

[56] References Cited

U.S. PATENT DOCUMENTS

| | | | |
|---|---|---|---|
| 3,674,920 | 7/1972 | Faroudja | 358/31 |
| 3,707,596 | 12/1972 | Kuhn | 358/31 |
| 3,836,707 | 9/1974 | Murakami et al. | 358/31 |
| 3,858,240 | 12/1974 | Golding et al. | 358/13 |
| 3,895,393 | 7/1975 | Drummond et al. | 358/31 |
| 3,931,637 | 1/1976 | Carpenter | 358/38 |
| 3,971,064 | 7/1976 | Milbourn | 358/904 |
| 3,984,631 | 10/1976 | Avicola | 358/904 |

FOREIGN PATENT DOCUMENTS 859,081   1/1961   United Kingdom ............ 358/30

*Primary Examiner*—Robert L. Richardson
*Attorney, Agent, or Firm*—George R. Pettit

[57] ABSTRACT

This invention relates to the television art. Specifically, apparatus for separating luminance and chroma information in a color video signal using comb filtering techniques is provided. Picture quality is enhanced by increasing frequency content while decreasing noise in the recovered chroma signals. Separation is achieved with a minimum compromise in vertical resolution.

12 Claims, 4 Drawing Figures

CIRCUIT FOR SEPARATING CHROMA AND LUMINANCE INFORMATION IN A COMPOSITE VIDEO SIGNAL

BACKGROUND OF THE INVENTION

This invention relates to the color television art. More specifically it relates to improvements in comb filtering techniques for separating the chroma and liminance information contained in a color television video signal.

In the NTSC color picture transmission system, the total bandwidth of approximately 4.2 MHz is available to transmit color picture information. The picture signal comprises a luminance signal and a chrominance signal. The luminance signal is spread throughout the 4.2 MHz bandwidth at discreet intervals of Fh, the horizontal sweep frequency, with a major portion of the luminance energy contained in a bandwidth less than 2.0 MHz. The chrominance information from the television camera is transmitted by modulating a subcarrier, the subcarrier having a frequency of (N+½)Fh, with chrominance information. The sidebands of the subcarrier which contain the chrominance information occur at Fh intervals, but because the subcarrier was selected to be at (N+½)Fh, the color subcarrier sidebands, referred to as the chroma signal, are interleaved with the luminance signal frequency components.

One widely used technique for separating the luminance and chroma signals requires a bandwidth limited luminance amplifier in series with a notch filter tuned to the subcarrier frequency. The composite video signal containing chroma and luminance signals is supplied to the bandwidth limited luminance amplifier. The output signal from the amplifier-notch filter combination contains only the low frequency portion of the video signal. This signal contains principally luminance information as the chroma information is found in the high frequency portion of the video signal. The bandwidth limitation of the luminance amplifier results in removal of the chroma signal.

The composite video signal is also supplied to a bandpass filter which is centered at the color subcarrier frequency. The bandpass filter removes most of the luminance signal and yields a signal which contains principally chroma information.

This method of separating the chroma signal from the luminance signal leaves high frequency luminance signals in the chroma channel producing an objectionable interference in the color signal.

The presence of this interference, referred to as cross color in the art, deteriorates picture quality, and the limited bandwidth of the luminance signal limits the picture resolution. Comb filtering techniques have been developed to separate composite chroma and luminance signals which improve upon previous methods of separating chroma and luminance signals. Prior art comb filters, described more particularly in U.S. Pat. No. 3,836,707 make use of a delay line in combination with a summing network to obtain the luminance signal from a composite video signal. Separation occurs when the delay line output is added to the undelayed luminance signal. The response of the comb filter is characterized by a series of bandpass "teeth" having a minimum insertion loss at frequencies of (N)Fh and a maximum insertion loss at frequencies of (N+½)Fh. This produces the luminance signal components contained in the composite video signal.

Similarly, the chroma signal may be obtained by subtracting the delayed video siganl from the undelayed video signal. The frequency response of this comb filter is characterized by having a minimum attenuation at frequencies of (N+½)Fh and a maximum attenuation at frequencies of (N)Fh.

It is known that the comb filter "teeth" may be narrowed or widened by adding feedback from the filter output to the input of the dealy line. Although narrowing the comb filter teeth improves both signal to noise ratio and cross color rejection of the separated chroma signals, it tends to reduce the vertical definition of the picture produced by the signal. Therefore, most comb filter structures result in a compromise between improved signal to noise ratio and a tolerable loss in vertical definition.

SUMMARY OF THE INVENTION

It is accordingly an object of this invention to separate the chroma signal and luminance signal from a composite video signal.

It is an additional object of the invention to provide a comb filter with a selectable bandwidth.

It is another object of this invention to increase the bandwidth of separated luminance and chroma signals in a color television receiver.

It is a further object of this invention to improve the signal to noise ratio and cross-color rejection of separated chroma and luminance signals.

These and other objects may be accomplished by the present invention. A delay line receives a composite video signal and delays the video signal for one horizontal line ($1/F_h$ seconds) in a conventional raster scan television receiver. The delayed video signal is combined with an undelayed video signal to produce the separated chroma and luminance signals. In one embodiment of the present invention, the bandwidth of the individual comb teeth in the comb filter may be altered in accordance with the signal to noise ratio of a received video signal. By controlling the bandwidth in such a manner, only those signals requiring narrow bandwidth filtering suffer from an undesirable loss in vertical definition. Those received signals which have a sufficient signal to noise ratio are filtered with wider bandwidth "teeth" thereby preserving vertical definition.

The luminance signal is derived in one embodiment of the invention by subtracting a derived chroma signal from the unfiltered composite video signal.

These and other objects and features of the present invention may be understood with reference to the accompanying figures and the description of the preferred embodiment.

DESCRIPTION OF THE PREFERRED EMBODIMENT

Figure 1:
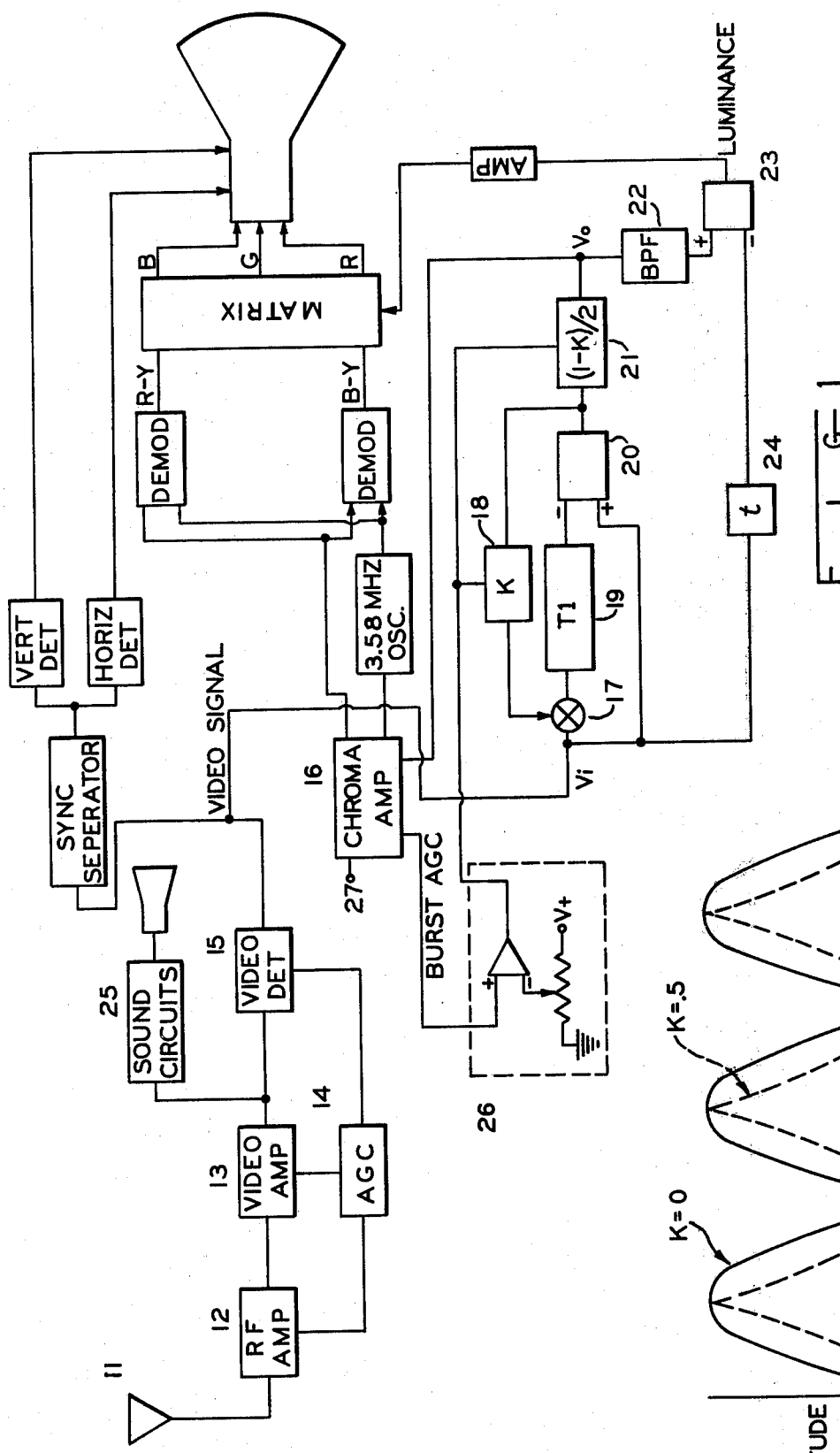
FIG. 1 is a partial block diagram of a television receiver incorporating an embodiment of the present invention for separating the chroma signal from the luminance signal.

Referring now to FIG. 1, a partial block diagram of a color television receiver incorporating one embodiment of the present invention used for separating luminance and chroma signals is shown. The transmitted television signal is received by an antenna 11 which introduces the received television signal to an RF amplifier 12. RF amplifier 12 provides a down converted intermediate frequency signal containing picture and sound information to video amplifier 13. The resulting amplified signal is supplied to a video detector 15 and sound detection circuitry 25. The video detector 15 provides the demodulated composite video signal containing chroma and luminance signal information used to generate the color television receiver picture.

The recovered video signal is supplied to the input of a summing junction 17. The output of the summing junction 17 is supplied to a delay network 19. The delay network 19 provides a delay to the composite video signal of approximately $1/F_h$ seconds, where $F_h$ is the horizontal scan rate of the television receiver. The delayed signal from delay network 19 is subtracted by a subtractor network 20 from the input video signal. The resulting signal is simultaneously applied to a feedback network 18 having a voltage transfer function of K, where $0 \leq /K/ < 1$, and to an amplifier having a gain of $(1-K/2)$. The output of the feedback network 18 is supplied to the remaining input of summing junction 17.

The transfer function associated with the feedback network and the gain of the amplifier receiving the combed chroma signal may be controlled. In the embodiment shown in FIG. 1, this control is derived by sensing the level of the burst AGC. The burst AGC is generated in a chroma amplifier 16 in many television receivers and is an indication of the signal level of the received chroma signal. By monitoring the burst AGC voltage with circuitry shown in 26, an indication of the signal to noise ratio of the incoming signal may be used to control the filter bandwidth. The circuit shown in block 26 represents a comparator circuit for detecting when a burst AGC voltage is above or below a reference value. The output of the comparator 26 is used to selectively change the value of K. By changing the value of the transfer function K of feedback network 18 and the gain of amplifier 21 simultaneously, the bandwidth of the resulting comb filter structure may be altered according to the signal to noise ratio of a received signal. Those skilled in the art will recognize that the burst AGC is only one of a number of circuit indications which may be used to provide a signal indicative of the received signal's signal to noise ratio. The I.F. amplifier AGC voltage and other signals within the receiver may also be used for this control function by those skilled in the art. Also peak detection of the chroma signal level may be used to derive a control voltage for altering the filter response. Many prior art color television receivers have an output terminal 27 on the chroma amplifier providing a voltage indicative of the chroma signal amplitude.

The chroma signal derived from amplifier 21 is supplied to bandpass filter 22. The output of bandpass filter 22 is subtracted from the unprocessed video signal to derive a luminance signal. The subtractor network 23 for deriving the luminance signal receives a slightly delayed video signal provided by delay circuit 24. This time delay is introduced in order to compensate for delays experienced by the chroma signal during the bandpass filtering. By subtracting in subtractor network 23 the bandpass filter output chroma signal from the slightly delayed video signal a luminance signal is obtained.

The operation of the comb filter used to derive a chroma signal is shown in FIG. 1 and may be summarized by the following equation:

$$\frac{Vo(s)}{Vi(s)} = \frac{(1-K)}{2} \times \frac{1 - e^{-sT_1}}{1 + Ke^{-sT_1}}$$

Vi(s) corresponds to composite video signal produced by video detector 15. Vo(s) corresponds to the output chroma signal derived from filtering and amplifying the composite video signal. $T_1$ corresponds to the delay (established as $1/F_h$ seconds) of delay line 19. The transfer function for feedback network 18 is represented by K. From the above equation it follows that when $e^{-sT_1} = -1$, the output Vo(s) will be at a maximum. When $e^{-sT_1} = 1$, the value of Vo(s) will be zero. Since it has been established that $T_1$, the delay of network 19 is equivalent to $1/F_h$, where $F_h$ is the horizontal scan frequency, video signals centered around $F_h$ and multiples of $F_h$ do not appear at the output of the subtractor network 14. Signals centered around $(N+\frac{1}{2})F_h$ will produce a maximum output from the subtractor network 20. since signals having frequencies of $(N+\frac{1}{2})F_h$ necessarily include chroma information, an effective filtering is realized. Amplifier 21 maintains a constant chroma signal amplitude for different levels of feedback signals provided by network 18.

Having derived the chroma signal from the composite video signal, the luminance signal is derived. It has been found that bandpass filtering the chroma signal before subtracting from the composite video signal improves the recovered luminance signal. The bandpass filter is centered around the color subcarrier frequency, 3.58 MHz. Any luminance signal which was not successfully filtered due to the bandwidth limitations of the circuitry used in the filter network will not be subtracted from the composite video signal thereby resulting in a loss of otherwise available luminance signal information. As the bandwidth of the comb filter delay line is improved the necessity for the bandpass filter decreases and it may be desirable to eliminate the bandpass filter entirely.

Figure 2:
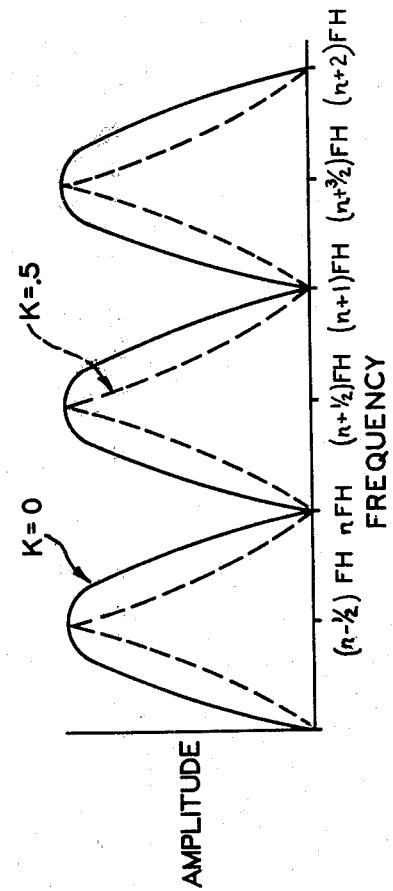
FIG. 2 illustrates the frequency response of the chroma channel filtering.

Referring now to FIG. 2, the effect of the feedback signal provided by feedback network 18 is apparent. As the transfer function K of feedback network 18 is changed from zero, indicating no feedback signal, to +0.5 by way of example, the "teeth" of the comb filter circuit are effectively narrowed. This narrow bandwidth will provide an improved signal to noise ratio and improved cross-color rejection of the derived chroma signal. However, the reduced bandwidth does deteriorate vertical definition. Therefore by automatically controlling the transfer function K in accordance with the signal to noise ratio of a received signal, the effects of loss in vertical definition may be minimized. Signals having an adequate signal to noise ratio, therefore not benefiting significantly from filtering with a narrower bandwidth, will be processed with zero feedback signal. Those signals which require an improvement in the signal to noise ratio will be processed with a narrower band comb filter by increasing the transfer function K to 0.5. In the embodiment shown, this change in feedback signal is produced by monitoring the burst AGC voltage with a comparator circuit 26 known to those skilled in the art. When the burst AGC voltage indicating a relatively poor signal to noise ratio of signals occurring near 3.58 MHz is detected, the feedback constant K is changed from zero to 0.5.

The change in feedback network 18 transfer function K will cause the output derived from subtractor circuit 20 to change. To compensate for the increase in signal experienced at the output of subtractor circuit 20 corresponding to an increase in the transfer function K, an amplifier 21 having an adjustable gain is used to amplify this signal to a greater extent than for signals which do not receive the benefit of feedback. In this manner, the chroma signal is kept constant in amplitude for different values of feedback signal.

Figure 3:
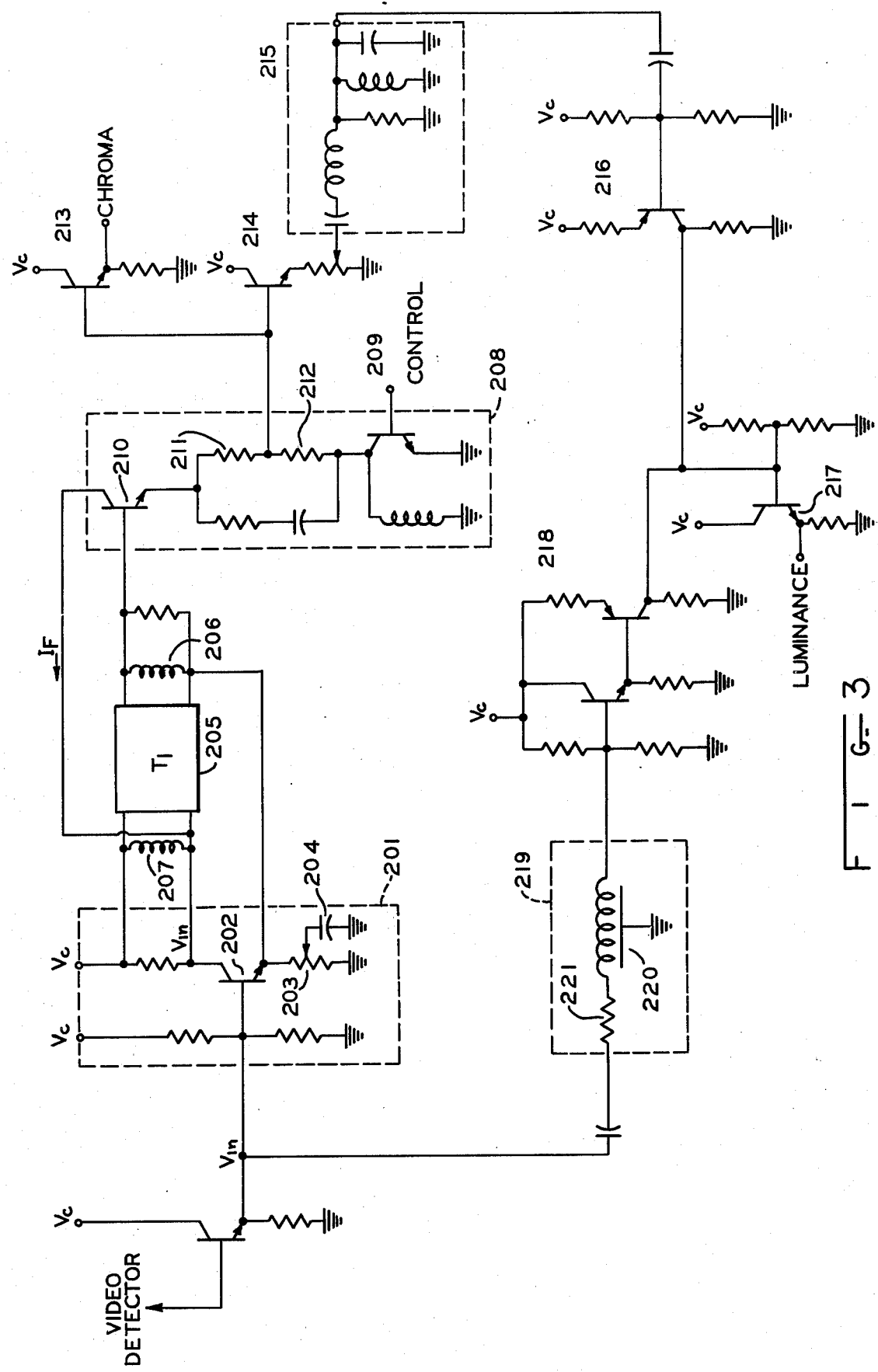
FIG. 3 is a schematic drawing of a circuit for realizing one comb filter technique in accordance with the invention.

Referring now to FIG. 3, a detailed schematic of apparatus for accomplishing the chroma and luminance signal separation techniques of FIG. 1 is shown. The video detector of FIG. 1 supplies a signal to the input of an amplifier 201 and to a delay network 217. The amplifier 201 divides the input signal into two additional signals having the same amplitude as the input signal Vin. As can be seen from FIG. 3, amplifier 201 is a standard common emitter transistor amplifier. A transistor 202 has its emitter terminated in a variable potentiometer 203. The wiper arm of the potentiometer is connected to ground through a capacitor 204. This allows the signal produced at the collector of transistor 202 to be changed in amplitude without affecting the signal at the emitter of transistor 202.

Signals produced at the collector and emitter of transistor 202 are supplied to a delay network 205 having a delay of $1/F_h$ seconds. The input and output of delay network 205 are terminated with inductors 206 and 207 for impedance matching the delay line to the input and output circuitry. By supplying a signal from the emitter of transistor 202 to the output of the delay line as shown, the subtractive process required in FIG. 1 is realized. The output from delay line 205 containing the chroma information is thereafter supplied to another transistor amplifier circuit 208. Transistor amplifier 208 has a selectable gain. By applying a DC logic level to the control input 209, the gain of amplifier 208 may be changed. This gain change is realized by causing the emitter impedance of the transistor 210 to increase or decrease depending upon the voltage applied to control input 209. When the voltage to control input 209 exceeds a base-emitter junction voltage, the gain imparted to signal appearing at the collector of transistor 210 is increased, thereby increasing the value of the feedback signal supplied to the input of delay line 205. In this embodiment, by applying a voltage to control input 209, the feedback signal supplied to the input of delay line 205 may be varied, thereby varying the filter response as shown in FIG. 2.

Simultaneously, with the increase of feedback signal supplied by transistor 210, there is a decrease in the signal at the junction of resistors 211 and 212. The signal at the junction of resistors 211 and 212 will therefore vary as the feedback signal to delay line 205 changes. This signal is therefore controlled in accordance with the feedback signal and thereby corresponds to the output signal of amplifier 21 in FIG. 1.

The chroma signal provided by amplifier 208 is amplified by emitter follower 213 and an emitter follower 214. Emitter follower 214 is equipped with a variable resistor to selectably adjust the level of chroma signal which will be subtracted from the main video signal Vin to derive a luminance signal. Before subtracting the chroma signal from the composite video signal, a bandpass filter 213 receives amplified chroma signals. Bandpass filter 215 will remove uncancelled luminance signal which may appear in the chroma signal due to bandwidth limitations in the delay network 205. As the bandwidth experienced by many commerically available delay lines may be insufficient to cause complete cancellation of luminance signal, the bandpass filter 215 is used to supply further reduction of luminance signals below 3.0 MHz. The bandpass filter centered at 3.58 MHz allows substantially all chroma signals with a minimum attenuation to be applied through another amplifier 216. Amplifier 216 having an inverted output provides the amplified bandpass filtered chroma signal to the base of a transistor 217 where it is combined with a slightly delayed composite video signal Vin. The composite video signal is slightly delayed by delay circuit 219 which includes a delay line 220 and impedance matching resistor 221 to compensate for delays experienced by the chroma signal in the bandpass filter structure 215. The delayed video signal is inverted by amplifier 218 before being combined at the base of transistor 217. The phase of the amplified and inverted video signal applied to the base of transistor 217 and the phase and amplitude of the filtered chroma signal supplied by amplifier 216 are such that a luminance signal is derived at the emitter of transistor 217. The resulting luminance signal is relatively free from chroma information.

With the embodiment of FIG. 3, a selectable bandwidth for the comb filter teeth is provided. The transfer function associated with the feedback network supplying a signal from the output of delay line 205 to the input of delay line 205 is either of two discreet values, depending upon the control voltage is applied to control input 209 of amplifier 208.

A further improvement upon the embodiment shown in FIG. 3 may be realized by providing a feedback signal which may be continuously varied from zero to a positive value. By having a capability of continuously selecting the value of a feedback signal, the response of the chroma filter may be changed gradually in accordance with received signal condition instead of discretely between two levels. The embodiment shown in FIG. 4 will provide a means for selecting the filter teeth bandwidth continuously from a maximum bandwidth represented by zero feedback signal to a minimum bandwidth corresponding to a transfer function of feedback network 18 (shown in FIG. 1) of 0.5. To implement the circuit of FIG. 4, the comparator circuit 26 of FIG. 1 is replaced with circuitry which will produce a continuous change in output voltage for changes in burst AGC voltage. Those skilled in the art will recognize many ways of providing such circuitry.

Figure 4:
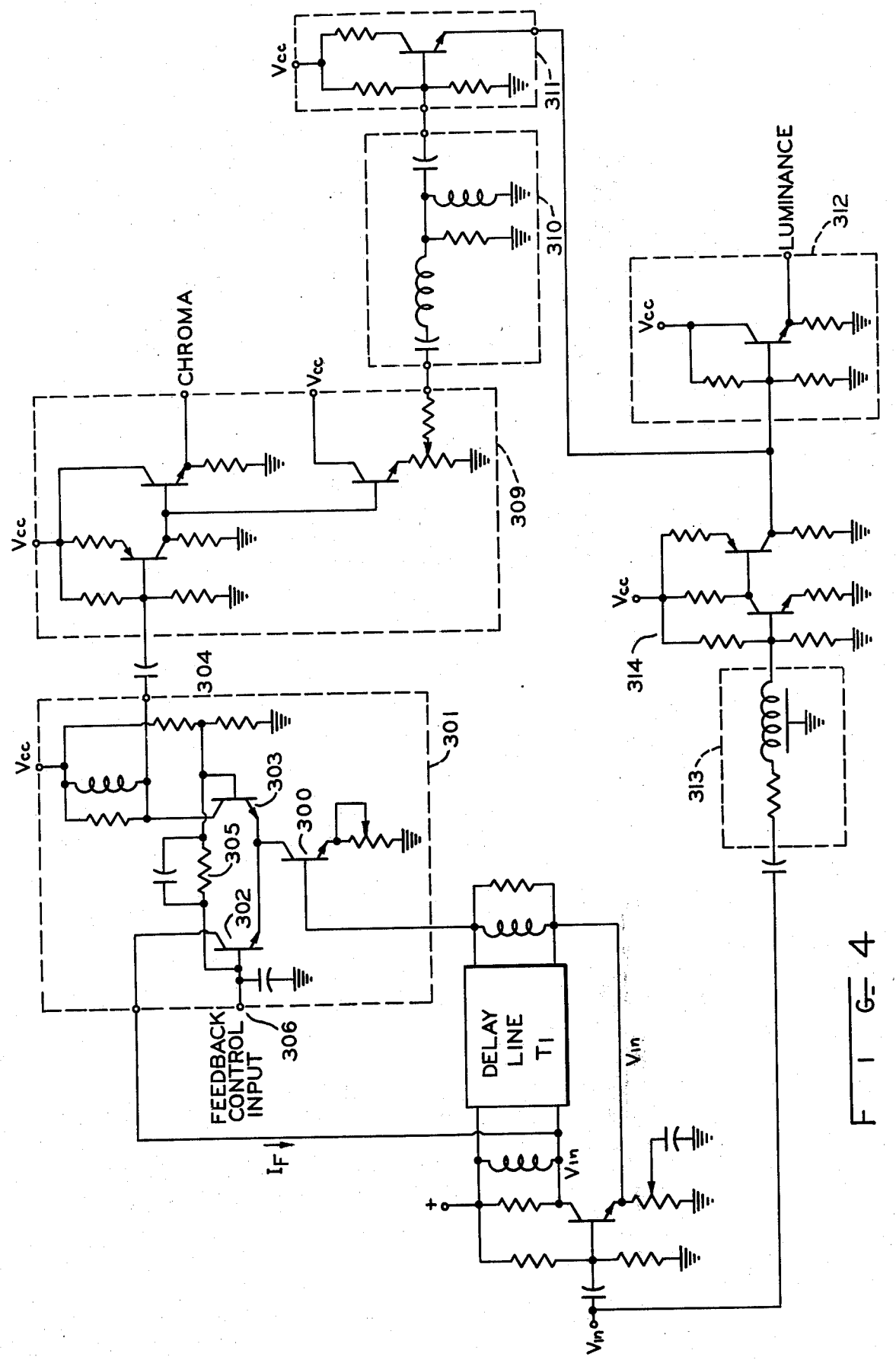
FIG. 4 is another schematic drawing of another apparatus for realizing the present invention.

In the embodiment of FIG. 4, a delay line $T_1$ similar to that of FIG. 3 is driven in a manner identical to that of FIG. 3. The output from the delay line containing the combed chroma information is converted into a current by a current source 300 located within a differential amplifier 301. The current produced by current source 300 drives the emitters of a differential pair of transistors 302, 303. Transistor 303 has a bias network 304 providing a DC voltage to the base of transistor 303. A resistor 305 connects the base of transistor 303 with the base of transistor 302. By applying a voltage to the control input 306 of amplifier 301, the relative signal levels of the combed chroma signal appearing at the collector of transistor 302 and transistor 303 may be varied. The collector of transistor 302 applies the feedback signal to the input of delay line $T_1$. The output from the collector of transistor 303 provides the amplitude controlled chroma signal for subtraction with the unfiltered video signal to produce the luminance signal. With amplifier circuit 301 shown in FIG. 4, a continuously changing feedback control voltage applied to terminal 306 will provide a continuously changing feedback voltage and an amplitude normalized chroma signal. Those skilled in the art will recognize that other means for controlling the feedback signal supplied to the delay line may be realized.

An amplifier 309 receives the amplitude normalized chroma signal for distribution to further chroma decoding circuitry in the television receiver, and for combination with the unfiltered video signal to produce the luminance signal. As in the embodiment shown in FIG. 3, the bandpass filter 310 is used to remove any uncancelled luminance signal which may be present in the chroma signal due to the aforementioned bandwidth problem associated with many commerically available delay lines. The signal from delay line 313 is applied to another amplifier for amplification and phase change before combining with the filtered chroma signal. Amplifier 314 is a standard amplifier circuit used to perform this function. Once phase change and gain increase has been realized, the delayed composite video signal when combined with the chroma signal will produce a luminance signal.

Control over the filter teeth bandwidth is maintained by monitoring the burst AGC or other signal strength indication means. Interface circuitry for converting changes in AGC voltages to a control voltage for applying to terminal 306 will be obvious to those skilled in the art.

Thus, there has been described with respect to several embodiments, apparatus for separating the chroma and luminance signal contained in a video signal in a television receiver. Although the invention has been described in terms of bandwidth control by monitoring internal signal indicating voltages, those skilled in the art will recognize that manual adjustment means may also be employed to change the filter teeth bandwidth. Those skilled in the art will recognize other equivalent circuits for achieving the apparatus described more particularly by the claims that follow.

What is claimed is:

1. A comb filter of the type having a delay means, said delay means having an input terminal adaptively connected to a source of video signal and an output terminal for delivering a delayed video signal, means for combining said delayed video signal with said video signal to produce a filtered signal and means for supplying a portion of said filtered signal as a feedback signal from said means for combining to said delay means input terminal whereby said feedback signal is combined with said video signal, further comprising means for varying said feedback signal in response to the signal to noise ratio of said video signal.

2. The apparatus of claim 1 further comprising means for keeping the amplitude of said comb filter output signal constant for different magnitudes of feedback signal.

3. In a color television receiver, an apparatus for providing a chroma signal from a composite video signal comprising:
   (a) a source of video signals;
   (b) a delay means having an input terminal and an output terminal, said input terminal being operatively connected to said source of video signals;
   (c) a subtractor circuit, said subtractor circuit being operatively connected to said source of composite video signals and said delay means output terminal;
   (d) feedback means for supplying a feedback signal from said subtractor circuit to said delay means input terminal whereby said feedback signal is combined with said video signals; and
   (e) means for selectively controlling the magnitude of said feedback signal.

4. The apparatus of claim 3 whereby said means for controlling the magnitude of said feedback signal is responsive to the signal to noise ratio of a received composite video signal.

5. The apparatus of claim 3 further comprising means for amplifying said subtractor circuit output signal.

6. The apparatus of claim 5 whereby said feedback means has a transfer function of K, and said amplifier means has a transfer function of $(1-K/2)$.

7. In a color television receiver, an apparatus for providing chroma and luminance signals comprising:
   (a) a source of composite video signals;
   (b) a delay means having an input terminal and an output terminal, said input terminal being operatively connected to said source of video signals;
   (c) a subtractor means operatively connected to said delay means output terminal and said source of video signals; said subtractor output signal comprising substantially all of said chroma signal contained in said composite video signals;
   (d) feedback means for supplying a feedback signal from said subtractor to said delay means input terminal whereby said feedback signal is combined with said video signals, said feedback means having a transfer function of K;
   (e) amplifier means for receiving said subtractor output signal, said amplifier means having a transfer function proportional to $1-K$, said amplifier means providing amplitude constant chroma signals;
   (f) bandpass filter means for receiving said amplifier means output signal;
   (g) delay compensation means for providing a delay compensated video signal having a delay equivalent to said bandpass filter delay; and
   (h) means for subtracting said delay compensated video signal from said amplitude constant chroma signals, said means for subtracting providing substantially all of said luminance signal contained in said composite video signal.

8. The apparatus of claim 7 further comprising means for varying said feedback means transfer function and said amplifier means transfer function.

9. The apparatus of claim 7 further comprising means for varying said feedback means transfer function and said amplifier means transfer function in response to the signal to noise ratio of said composite video signals.

10. The apparatus of claim 7 further comprising:
    (a) means for detecting the level of burst AGC voltage in said color television receiver; and
    (b) means for changing said feedback means transfer function in response to said level of burst AGC voltage.

11. The apparatus of claim 10 further comprising means for changing said amplifier means transfer function in response to said level of burst AGC voltage.

12. The apparatus of claim 7 further comprising means for detecting the amplitude of a received chroma signal; and
    (a) means for changing said feedback means transfer function in response to said amplitude of a received chroma signal.

* * * * *